（12）United States Patent
Lee et al.

(10) Patent No.: US 10,703,163 B2
(45) Date of Patent: Jul. 7, 2020

(54) VEHICLE HEIGHT ADJUSTING DEVICE (71) Applicants: Hyundai Motor Company, Seoul (KR); Kia Motors Corporation, Seoul (KR); ILJIN Co., Ltd., Gyeongju-si (KR); HYUNDAI MOBIS CO., LTD., Seoul (KR)

(72) Inventors: Chang Sin Lee, Seoul (KR); Sang Hoon Yoo, Hwaseong-si (KR); Byung Kyu Lee, Seoul (KR); Ig Jin Kwon, Gyeongju-si (KR); Won Hyok Choi, Seoul (KR)

(73) Assignees: Hyundai Motor Company, Seoul (KR); Kia Motors Corporation, Seoul (KR); ILJIN Co., Ltd, Gyeongju-si (KR); HYUNDAI MOBIS CO., LTD, Seoul (KR)

( * ) Notice: Subject to any disclaimer, the term of this patent is extended or adjusted under 35 U.S.C. 154(b) by 116 days.

(21) Appl. No.: 16/139,493

(22) Filed: Sep. 24, 2018

(65) Prior Publication Data

US 2019/0315181 A1 Oct. 17, 2019

(30) Foreign Application Priority Data

Apr. 12, 2018 (KR) ........................ 10-2018-0042973

(51) Int. Cl.
*B60G 17/027* (2006.01)
*B60G 11/16* (2006.01)
*B60G 15/06* (2006.01)

(52) U.S. Cl.
CPC .......... *B60G 17/0272* (2013.01); *B60G 11/16* (2013.01); *B60G 15/068* (2013.01); *B60G 2202/312* (2013.01); *B60G 2204/1242* (2013.01); *B60G 2500/30* (2013.01)

(58) Field of Classification Search
CPC ..... B60K 7/0007; B60G 17/021; B60G 11/16
See application file for complete search history.

(56) References Cited

U.S. PATENT DOCUMENTS

| 7,874,561 | B2 * | 1/2011 | Michel | B60G 17/021 280/6.157 |
| 7,922,181 | B2 * | 4/2011 | Hakui | B60G 15/063 267/175 |
| 8,262,100 | B2 * | 9/2012 | Thomas | B60G 17/021 188/321.11 |

(Continued)

FOREIGN PATENT DOCUMENTS

| DE | 102008025020 A1 * | 11/2009 | ........... B60G 17/021 |
| EP | 1927486 A2 * | 6/2008 | ........... B60G 17/021 |

(Continued)

*Primary Examiner* — Nicole T Verley
(74) *Attorney, Agent, or Firm* — Morgan, Lewis & Bockius LLP (57) ABSTRACT

A vehicle height adjusting device which adjusts vehicle height between a vehicle body and a lower arm, may include a suspension spring provided between the vehicle body and the lower arm; a variable portion provided inside an internal diameter of the suspension spring, and whose length is variable by converting a rotary driving motion around an axial direction into an axial rectilinear motion; and a power portion which is provided on the vehicle body, and rotates the variable portion.

7 Claims, 5 Drawing Sheets

(56) References Cited

U.S. PATENT DOCUMENTS

| | | | | |
|---|---|---|---|---|
| 8,469,370 B2* | 6/2013 | Kondo | ............... | B60G 17/0157 |
| | | | | 188/299.1 |
| 8,544,620 B2* | 10/2013 | Inoue | ................... | B60G 15/065 |
| | | | | 188/156 |
| 8,833,775 B2* | 9/2014 | Kim | ..................... | B60G 15/063 |
| | | | | 280/5.514 |
| 8,844,943 B2* | 9/2014 | Kim | ................... | B60G 17/0157 |
| | | | | 280/5.514 |
| 10,369,859 B2* | 8/2019 | Stolle | ................ | B60G 17/0272 |
| 2008/0164111 A1* | 7/2008 | Inoue | ................... | B60G 15/065 |
| | | | | 188/297 |
| 2009/0045595 A1* | 2/2009 | Michel | ................ | B60G 17/021 |
| | | | | 280/6.157 |
| 2012/0187640 A1* | 7/2012 | Kondo | ................... | B60G 11/58 |
| | | | | 280/5.514 |

FOREIGN PATENT DOCUMENTS

| | | | | | |
|---|---|---|---|---|---|
| EP | 1953013 A2 | * | 8/2008 | ........... | B60G 17/021 |
| EP | 1970228 A1 | * | 9/2008 | .............. | F16F 15/02 |
| EP | 2610090 A2 | * | 7/2013 | ........... | B60G 17/021 |
| JP | 2006064101 A | * | 3/2006 | ......... | B60G 17/0157 |
| JP | 2006207644 A | * | 8/2006 | | |
| JP | 2007253862 A | * | 10/2007 | | |
| KR | 10-2013-0041676 A | | 4/2013 | | |
| KR | 10-1254234 B1 | | 4/2013 | | |
| KR | 10-1263049 B1 | | 5/2013 | | |
| WO | WO-2007043352 A1 | * | 4/2007 | ......... | B60G 17/0157 |
| WO | WO 2015/040078 A1 | | 3/2015 | | |

* cited by examiner

VEHICLE HEIGHT ADJUSTING DEVICE

CROSS REFERENCE TO RELATED APPLICATION

The present application claims priority to Korean Patent Application No. 10-2018-0042973, filed Apr. 12, 2018, the entire contents of which is incorporated herein for all purposes by this reference.

BACKGROUND OF THE INVENTION

Field of the Invention

The present invention generally relates to a vehicle height adjusting device and, more particularly, to a vehicle height adjusting device provided between a vehicle body and a lower arm.

Description of Related Art

In the case of a vehicle with high height, when driving a slope way, such as a speed bump, a lamp type parking lot, etc., damage to a vehicle body due to a contact between a lower portion of the vehicle body and the ground may be prevented. On the other hand, in the case of a vehicle with low height, since air resistance is reduced while driving, the vehicle is advantageous in terms of high speed driving. Accordingly, since a function of adjusting the height of a vehicle is required depending on the situation, various ways of vehicle height adjusting methods have been applied.

However, a conventional vehicle height adjusting device is disadvantageous in that the volume and weight of necessary compositions may be excessive because of using air pressure, or a space for installing separate components should be prepared to adjust vehicle height even if a motor-operated type is applied.

Therefore, a compact vehicle height adjusting device, which can adjust vehicle height without varying a conventional layout, has been required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a compact vehicle height adjusting device provided inside a suspension spring disposed between a vehicle body and a lower arm so as not to affect a surrounding layout.

In various aspects of the present invention, there is provided a vehicle height adjusting device which adjusts vehicle height between a vehicle body and a lower arm, the device including: a suspension spring provided between the vehicle body and the lower arm; a variable portion provided inside an internal diameter of the suspension spring, and whose length is variable by converting a rotary driving motion around an axial direction into an axial rectilinear motion; and a power portion provided on the vehicle body, and rotating the variable portion.

The variable portion may include: an external housing which supports the suspension spring, and in which an empty space is defined; a nut provided inside the external housing, wherein a screw thread is provided on an internal circumference thereof; and a lead shaft coupled to the screw thread of the nut to be movable upward and downward with respect to the nut.

The power portion may include: a carrier connected to the lead shaft; a plurality of planet gears connected to the carrier; a ring gear which covers outsides of the planet gears; a sun gear shaft provided inside the planet gears; and a motor connected to the sun gear shaft to rotate the sun gear shaft.

The variable portion may further include: a central bearing provided on an external circumference of the lead shaft; an internal housing which is provided outside the central bearing, and contacts with an internal to the external housing; and a helper spring provided between the nut and the central bearing.

The variable portion may further include a sealing which blocks a gap between the external housing and the internal housing.

The power portion may include: a motor lower housing which supports the ring gear and the motor; a lower bearing which meditates between the motor lower housing and the sun gear shaft; a motor upper housing provided on an upper side of the motor lower housing and connected to the vehicle body; and an upper bearing which meditates between the motor upper housing and the sun gear shaft.

Central regions of the variable portion and the power portion may communicate with each other in an axial direction thereof.

According to the vehicle height adjusting device of the present invention, the effects are as follows.

First, the device is formed in a small size, so may be disposed without the interference of surrounding components.

Second, the height of the vehicle body may be controlled with small power using planet gears.

Third, since components communicate with each other in an axial direction thereof, resistance by vacuum or air compression is not generated.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Technical terms used herein are to mention only specific embodiments, but are not intended to limit the present invention. Singular forms used herein also include plural forms unless obviously representing opposite meanings. The term, "including," used in the specification materializes specific feature, region, essence, step, action, element, and/or component, but does not exclude the existence or addition of other specific feature, region, essence, step, action, element, component, and/or group.

Unless differently defined, all terms including technical terms and scientific terms used herein have the same meanings generally understood by a person skilled in the art. Terms defined in a regular dictionary should additionally be interpreted as meanings corresponding to related technical documents and currently disclosed contents, but should not be interpreted as ideal or very excessive meanings unless defined.

Hereinbelow, a vehicle height adjusting device according to exemplary embodiments of the present invention will be described in detail with reference to the accompanying drawings.

Figure 1:
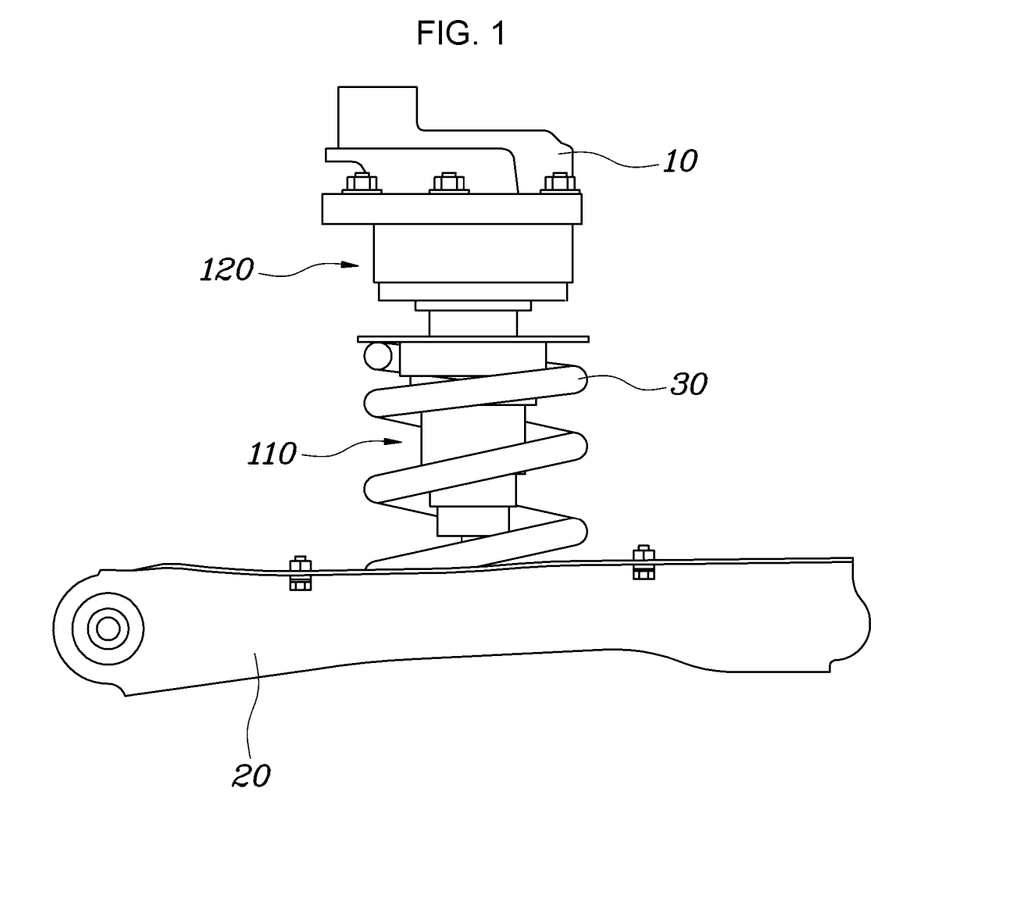
FIG. 1 is a perspective view of a vehicle height adjusting device according to an exemplary embodiment of the present invention.
Figure 2:
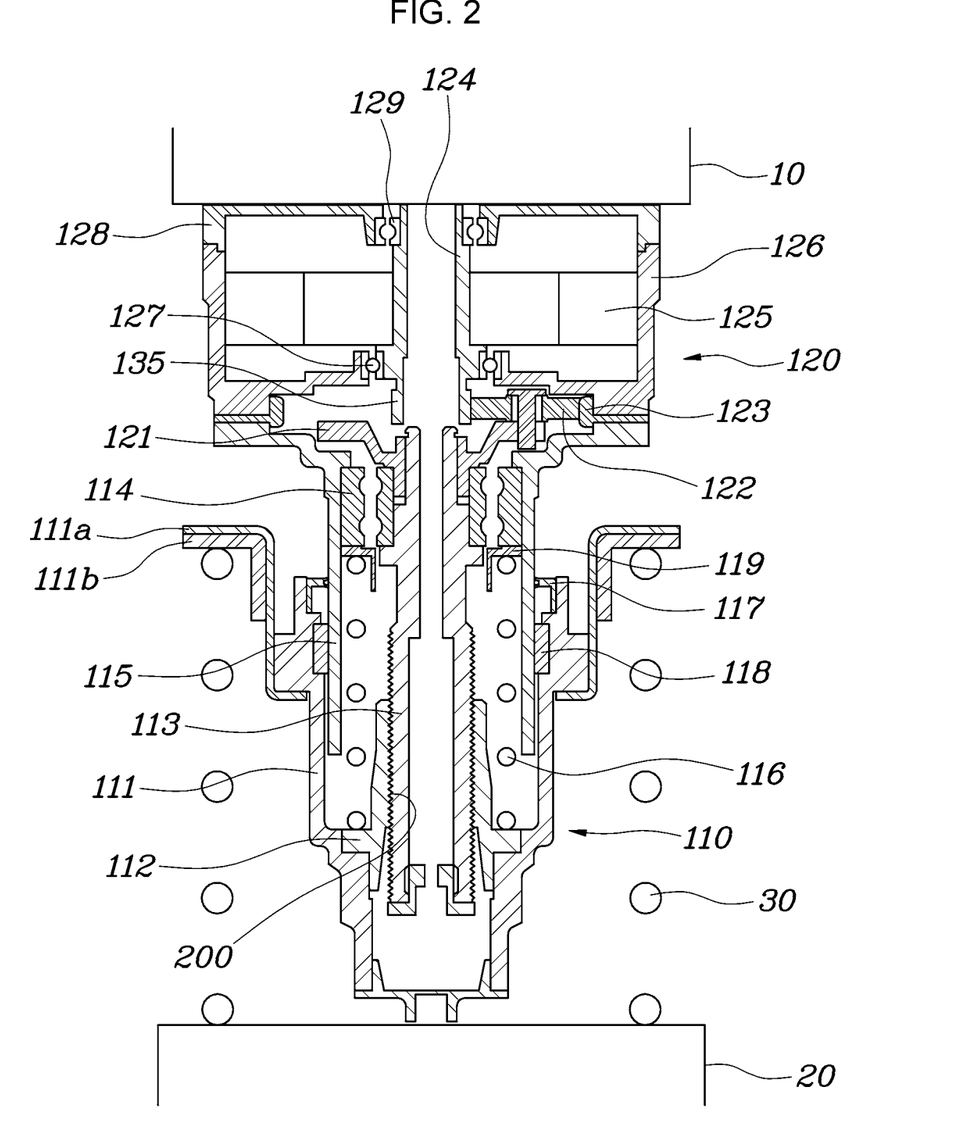
FIG. 2 is a sectional view of the vehicle height adjusting device according to an exemplary embodiment of the present invention.

FIG. 1 is a perspective view of the vehicle height adjusting device according to an exemplary embodiment of the present invention, and FIG. 2 is a sectional view of the vehicle height adjusting device according to an exemplary embodiment of the present invention.

For reference, an axial direction described hereinafter means upward and downward directions of FIG. 2.

As illustrated in FIG. 1 and FIG. 2, the vehicle height adjusting device according to an exemplary embodiment includes: a suspension spring 30 provided between a vehicle body 10 and a lower arm 20; a variable portion 110 provided inside an internal diameter of the suspension spring 30, and whose length is variable by converting a rotary driving motion around an axial direction into an axial rectilinear motion; and a power portion 120 which is provided on the vehicle body 10, and rotates the variable portion 110.

The suspension spring 30 is a component which elastically meditates the vehicle body 10 and the lower arm 20. One end portion of the suspension spring 30 is supported by the lower arm 20, and the other end portion thereof is supported by the variable portion 110. In other words, the vehicle body 10, the power portion 120, the variable portion 110, the suspension spring 30, and the lower arm 20 are sequentially connected to vary a gap between the vehicle body 10 and the lower arm 20.

The variable portion 110 is a main component, and includes an external housing 111, a nut 112, and a lead shaft 113.

The external housing 111 is a component by which the other end portion of the suspension spring 30 is supported, and is a pipe-shaped component which forms an external surface of the variable portion 110. A bent portion 111a, which is bent and extends in a diameter direction thereof, and by which the suspension spring 30 is supported, may be formed on an upper end portion of the external housing 111. The bent portion 111a may be integrally formed with the external housing 111, or may be coupled to the external housing 111 after being separately manufactured.

It is preferable to install a spring pad 111b on the bent portion 111a of the external housing 111, preventing damage caused by a collision between the suspension spring 30 and the external housing 111.

A nut 112 is coupled to an internal surface of the external housing 111, and a screw thread 200 is provided on an internal circumference of the nut 112. The nut 112 is integrally fixed to the external housing 111, so a relative position with respect to the suspension spring 30 is continuously maintained.

A lead shaft 113 is a pipe-shaped component coupled to the screw thread 200 formed on the internal circumference of the nut 112. When the lead shaft 113 rotates while the nut 112 is in a fixed state, the lead shaft 113 ascends or descends with respect to the nut 112 in an axial direction thereof.

The variable portion 110 may further include a central bearing 114, an internal housing 115, a helper spring 116, and a sealing 117.

The central bearing 114 is coupled to an external circumference of the lead shaft 113, and the internal housing 115 is coupled to an external circumference of the central bearing 114. Accordingly, the lead shaft 113 is disposed to be separately rotatable while the internal housing 115 is in a fixed state.

The internal housing 115 is inserted into the external housing 111 while covering an external side of the lead shaft 113, and ascends and descends along with the lead shaft 113 when the lead shaft 113 ascends or descends while rotating.

The helper spring 116 is provided between the internal housing 115 and the lead shaft 113, and assists the ascent of the lead shaft 113 by generating repulsive force between the nut 112 and the central bearing 114. In this regard, it is preferable to install a bearing guard 119 between the helper spring 116 and the central bearing 114 to bring the helper spring 116 into contact with an external iron of the central bearing 114.

The sealing 117 is provided between the external housing 111 and the internal housing 115, preventing the penetration of external foreign substances into a space between the external housing 111 and the internal housing 115.

Furthermore, a slip bushing 118 is provided between the external housing 111 and the internal housing 115, reducing friction by guiding the ascent or descent of the internal housing 115 inside the external housing 111.

The power portion 120 includes a planetary reduction gear including a carrier 121, planet gears 122, a ring gear 123, and a sun gear shaft 124; and a motor 125 coupled to the sun gear shaft 124 to rotate the sun gear shaft 124. Also, the power portion 120 further includes a motor lower housing 126, a lower bearing 127, a motor upper housing 128, and an upper bearing 129 to support each component and set it in a regular position.

The motor 125 is a component which rotates the sun gear shaft 124. When the sun gear shaft 124 rotates, a plurality of planet gears 122 engaged to a sun gear 135 mounted on an external circumference of the sun gear shaft 124 rotate inside the ring gear 123. Accordingly, the carrier 121 which fixes the planet gears 122 rotates along with the planet gears 122.

An axis of the carrier 121 is coupled to the lead shaft 113. Consequentially, the lead shaft 113 rotates as the motor 125 rotates, so may ascend or descent in an axial direction thereof.

The motor lower housing 126 and the motor upper housing 128 are components for covering the motor 125, the sun gear shaft 124, the ring gear 123, and the planet gears 122, and the carrier 121.

The motor 125 is fixed and provided inside the motor lower housing 126, and the lower bearing 127 is provided between the motor lower housing 126 and the sun gear shaft 124, so that the sun gear shaft 124 can rotate while the motor lower housing 126 is fixed to the vehicle body 10.

Furthermore, the ring gear 123 is fixed and provided on the motor lower hosing 126, so that the carrier 121 rotates by the rotation of the motor 125 without the rotation of the ring gear 123.

The motor upper housing 128 is a component provided between the motor lower housing 126 and the vehicle body 10, and is kind of like a lid which covers an exposed surface after mounting the planetary reduction gear including the motor 125. The motor upper housing 128 is fixed to the vehicle body, and is coupled to the sun gear shaft 124 by the medium of the upper bearing 129, so that the sun gear shaft 124 can rotate while the motor upper housing 128 is in a fixed state. The internal housing 115 of the variable portion 110 is coupled to the motor lower housing 126, preventing the rotation of the internal housing 115 when the lead shaft 113 rotates.

Meanwhile, the sun gear shaft 124, the carrier 121, and the lead shaft 113 are all formed in the shape of a pipe whose central portion is hollow, and communicate with each other in an axial direction thereof. When the lead shaft 113 ascends and descends, air flows through the hollow portion, minimizing resistance because vacuum or air compression is not generated.

Hereinafter, the operation relation of the vehicle height adjusting device according to an exemplary embodiment of the present invention will be described.

As illustrated in FIG. 1 and FIG. 2, when the motor 125 rotates the sun gear shaft 124, the planet gears 122 coupled thereto rotate, rotating the lead shaft 113 by the rotation of the carrier 121 connected to the planet gears 122.

The lead shaft 113 is coupled to the nut 112 by the screw thread 200, so when the lead shaft 113 rotates, the lead shaft 113 ascends or descends in an axial direction with respect to the position of the nut 112.

Figure 3:
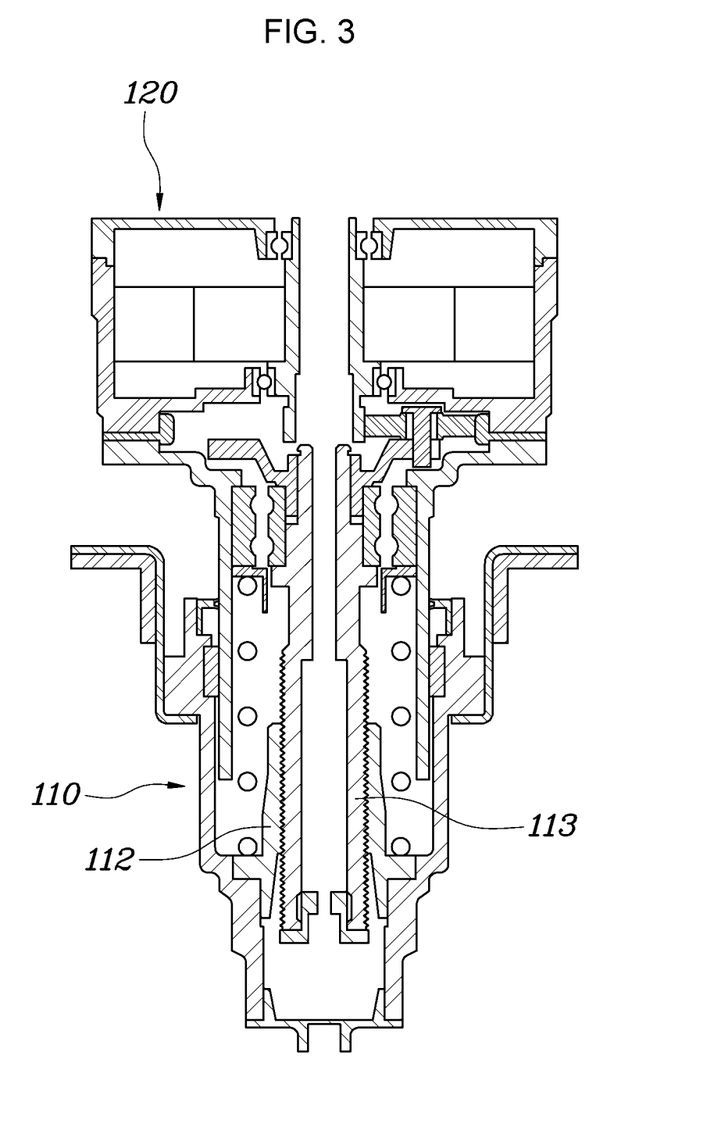
FIG. 3, FIG. 4 and to FIG. 5 are views showing operation images of the vehicle height adjusting device according to an exemplary embodiment of the present invention.

FIG. 3 illustrates images where a gap between the power portion 120 and the variable portion 110 changes as the lead shaft 113 rotates.

Figure 4:
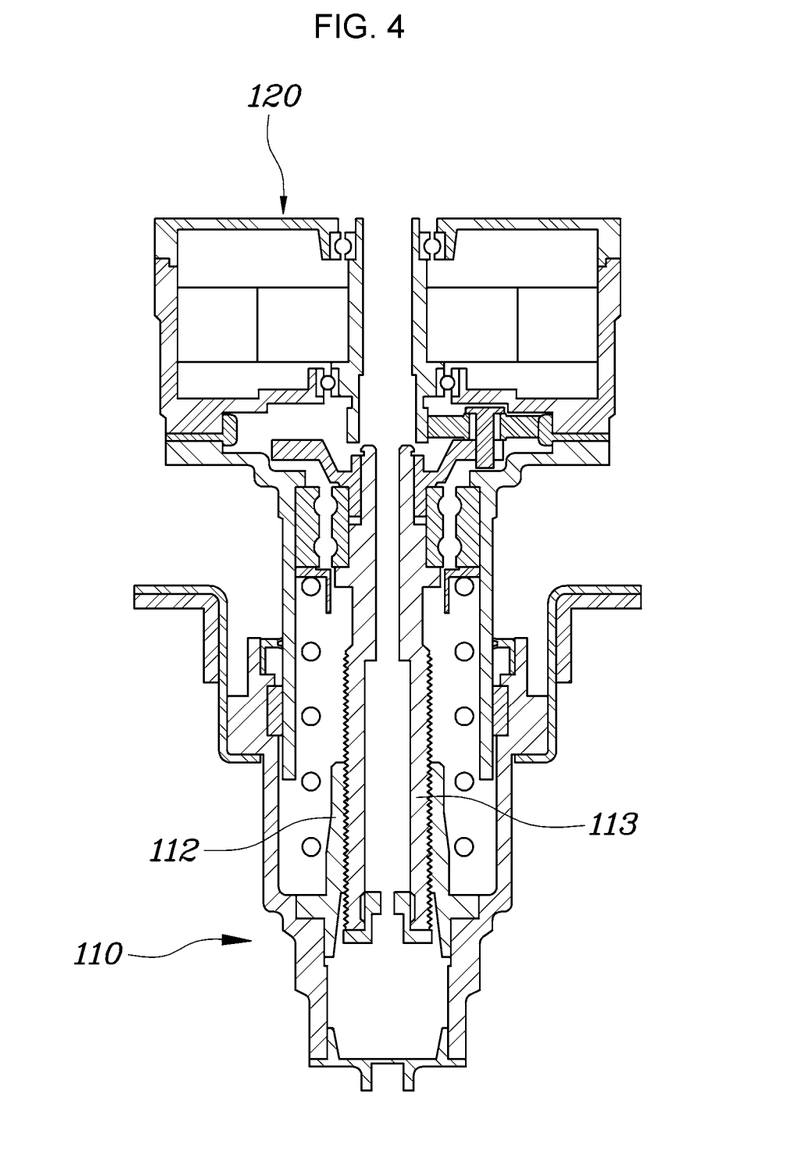
Figure 5:
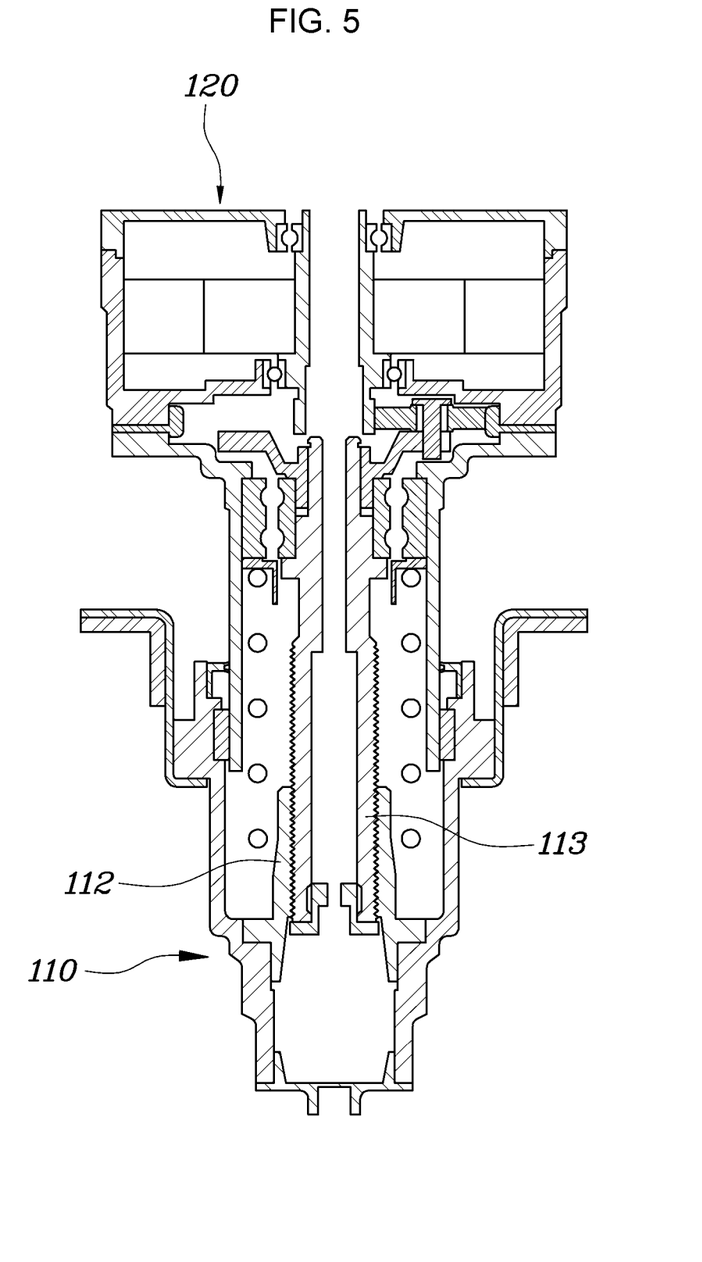

In the case that an intermediate position of the lead shaft 113 inside the variable portion 110 is a reference point as illustrated in FIG. 4, when the lead shaft 113 inside the variable portion 110 maximally descends as illustrated in FIG. 3, the gap between the variable portion 110 and the power portion 120 minimizes, descending vehicle height. Meanwhile, when the lead shaft 113 inside the variable portion 110 maximally ascends as illustrated in FIG. 5, the gap between the variable portion 110 and the power portion 120 maximizes, ascending the vehicle height.

According to an exemplary embodiment of the present invention, the vehicle height adjusting device is provided inside the suspension spring in a compact size, preventing interference in a surrounding layout. Also, the vehicle body may be ascended with relatively low motor output using the planetary reduction gear.

Although an exemplary embodiment of the present invention has been described with reference to the accompanying drawings, those skilled in the art may understand that the present invention may be conducted in other specific forms without modifying the technical ideas or essential features.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle height adjusting device, which adjusts a vehicle height between a vehicle body and a lower arm, the device comprising:
a suspension spring mounted between the vehicle body and the lower arm;
a variable portion provided inside an internal circumference of the suspension spring, wherein a length of the variable portion is variable by converting a rotary driving motion around an axial direction thereof into an axial rectilinear motion; and
a power portion provided on the vehicle body, and selectively rotating the variable portion,
wherein the variable portion includes:
an external housing which supports the suspension spring;
a nut fixed to the external housing, wherein a screw thread is provided on an internal circumference of the nut; and
a lead shaft engaged to the screw thread of the nut to be selectively movable upward and downward with respect to the nut according to operation of the power portion.

2. The vehicle height adjusting device of claim 1, wherein the power portion includes:
a carrier connected to the lead shaft;
a planet gear coupled to the carrier;
a ring gear engaged with the planet gear;
a sun gear shaft provided inside the planet gear and including a sun gear, wherein the planet gear is engaged to the sun gear and the ring gear; and
a motor connected to the sun gear shaft to rotate the sun gear of the sun gear shaft.

3. The vehicle height adjusting device of claim 1, wherein the variable portion further includes:

a central bearing provided on an external circumference of the lead shaft;

an internal housing which is provided outside the central bearing, and contacts with an internal circumference of the external housing; and a helper spring mounted between the nut and the central bearing.

4. The vehicle height adjusting device of claim 2, wherein the power portion further includes:

a motor lower housing rotatably supporting the ring gear and fixedly supporting the motor;

a lower bearing disposed between the motor lower housing and the sun gear shaft;

a motor upper housing provided on an upper side of the motor lower housing and connected to the vehicle body to rotatably support the sun gear shaft; and an upper bearing disposed between the motor upper housing and the sun gear shaft.

5. The vehicle height adjusting device of claim 3, wherein a bearing guard is mounted between the helper spring and the central bearing to bring the helper spring into contact with an external member of the central bearing.

6. The vehicle height adjusting device of claim 3, wherein the variable portion further includes:

a sealing blocking a gap between the external housing and the internal housing.

7. The vehicle height adjusting device of claim 1, wherein central regions of the variable portion and the power portion communicate with each other in an axial direction thereof.

* * * * *